United States Patent [19]

Mueller

[11] 4,293,117
[45] Oct. 6, 1981

[54] PLUG VALVE ACTUATOR

[75] Inventor: John H. Mueller, Houston, Tex.

[73] Assignee: Intercontinental Valve Manufacturing Company, Cincinnati, Ohio

[21] Appl. No.: 29,678

[22] Filed: Apr. 13, 1979

[51] Int. Cl.³ .................. F16K 31/50; F16K 31/52
[52] U.S. Cl. .................................. 251/229; 74/57;
251/267; 251/252
[58] Field of Search .................. 74/424.8 VA, 57;
251/251, 252, 58, 266, 267, 229, 14, 56, 269,
257, 258

[56] References Cited

U.S. PATENT DOCUMENTS

| | | | |
|---|---|---|---|
| 1,451,473 | 4/1923 | Pulverman | 251/266 |
| 1,922,190 | 8/1933 | Atterbury | 251/267 |
| 2,078,231 | 4/1937 | Brisbane | 251/56 |
| 2,149,725 | 3/1939 | Canariis | 251/56 |
| 2,153,885 | 4/1939 | Goldberg et al. | 251/56 |
| 2,883,144 | 4/1959 | Kendig | 251/58 |
| 3,046,802 | 7/1962 | Cupedo | 251/62 |
| 3,078,065 | 2/1963 | Vickery | 251/58 |
| 3,184,214 | 5/1965 | King | 251/252 |
| 3,240,466 | 3/1966 | Meyer | 251/14 |
| 3,319,925 | 5/1967 | Kojima et al. | 251/252 |
| 3,370,827 | 2/1968 | Stehlin | 251/58 |
| 3,396,938 | 8/1968 | Matusi | 251/266 |
| 3,417,960 | 12/1968 | Stehlin | 251/14 |
| 3,450,382 | 6/1969 | Calim | 251/58 |
| 3,492,880 | 3/1970 | Pearson | 251/58 |
| 4,120,479 | 10/1978 | Thompson et al. | 251/229 |

Primary Examiner—Martin P. Schwadron
Assistant Examiner—G. L. Walton
Attorney, Agent, or Firm—Frost & Jacobs

[57] ABSTRACT

An actuator for a plug valve of the type having a body with a central chamber having diametrically opposed inlet and outlet ports and a plug within the chamber having a transverse passage therethrough and an upstanding stem. The plug has a first, upper, valve-open position with its transverse passage in alignment with the inlet and outlet ports of the chamber, and a second, lower valve-closed position wherein its transverse passage is oriented at 90° to the chamber inlet and outlet ports and seal means on the plug are in sealing engagement with the chamber walls about the inlet and outlet ports. The top of the chamber is closed by a bonnet having a packing gland through which the plug stem extends. The actuator comprises a hollow cylindrical yoke, the lower end of which is affixed to the bonnet with the plug stem extending into the yoke. The upper end of the yoke is provided with a bearing cap. A drive nut, having a threaded axial bore and a hand wheel or the equivalent affixed thereto, is rotatively mounted in the bearing cap. A threaded stem is engaged in the drive nut. The lower end of the threaded stem and the upper end of the plug stem are both non-rotatively affixed to a cylindrical coupling within the yoke. One of the yoke and the coupling has diametrically opposed cam slots formed therein. The other of the yoke and coupling supports a cam follower for each cam slot. The cam slots are so configured that upon turning the drive nut in one direction, the plug in its valve-open position will be simultaneously partially lowered and turned 90° and there-after lowered without rotation to its valve-closed and sealed position. Upon turning the drive nut in the opposite direction, the plug will first be lifted vertically without rotation out of sealing relationship with the chamber inlet and outlet ports and thereafter simultaneously lifted and rotated 90° to its valve-open position.

8 Claims, 7 Drawing Figures

FIG. 1

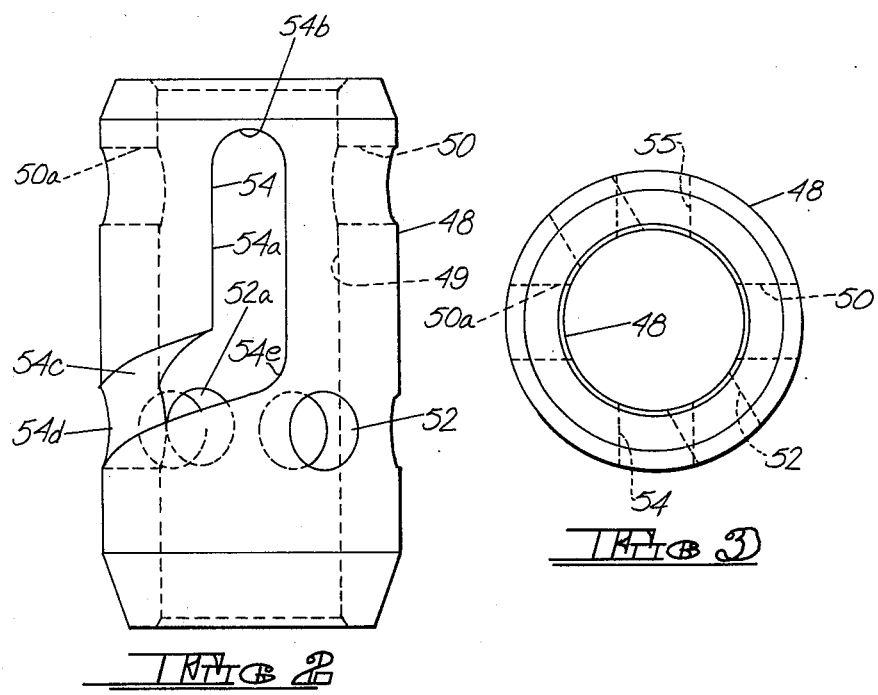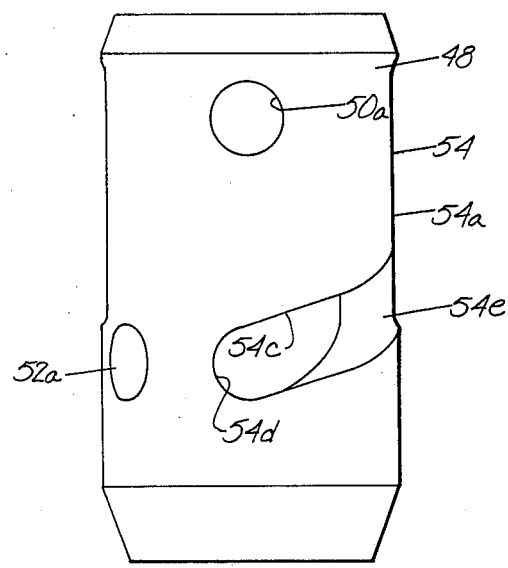

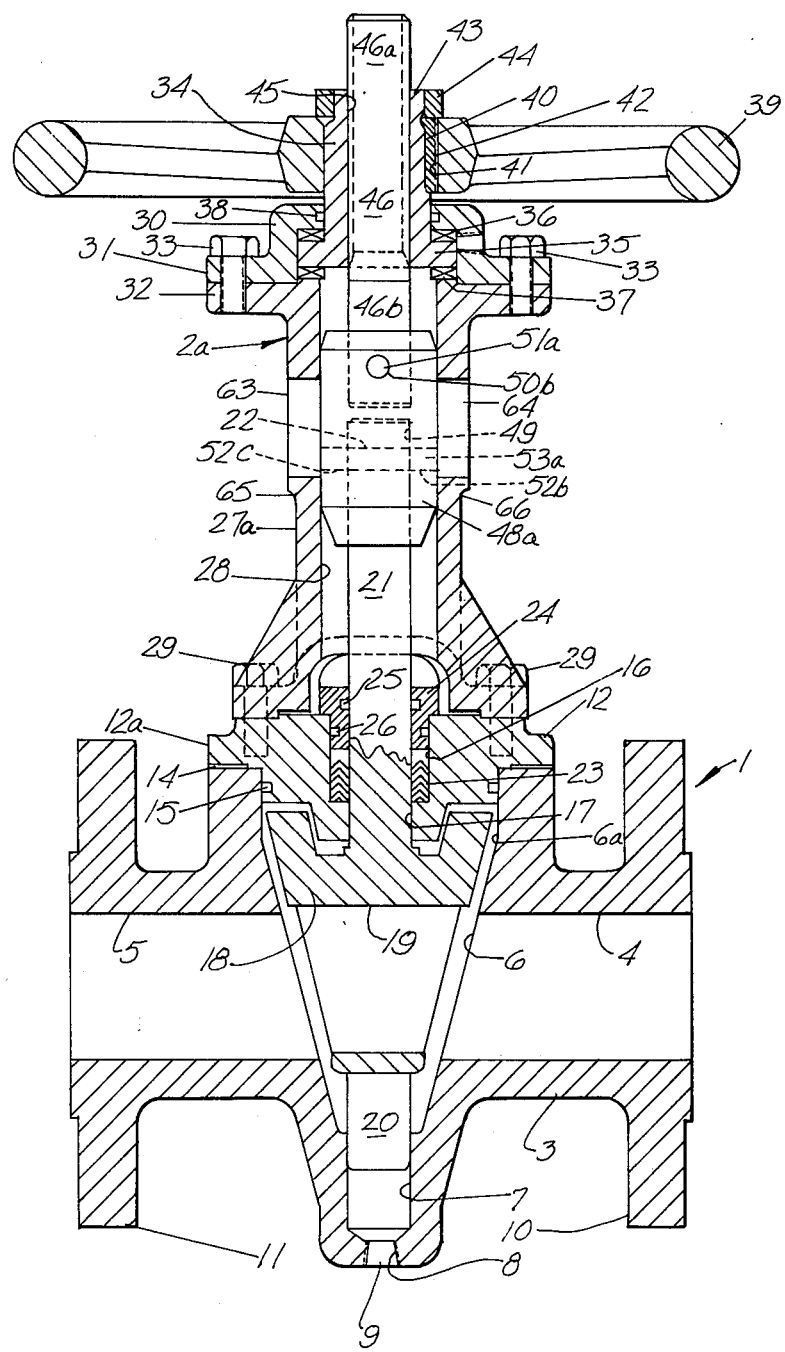

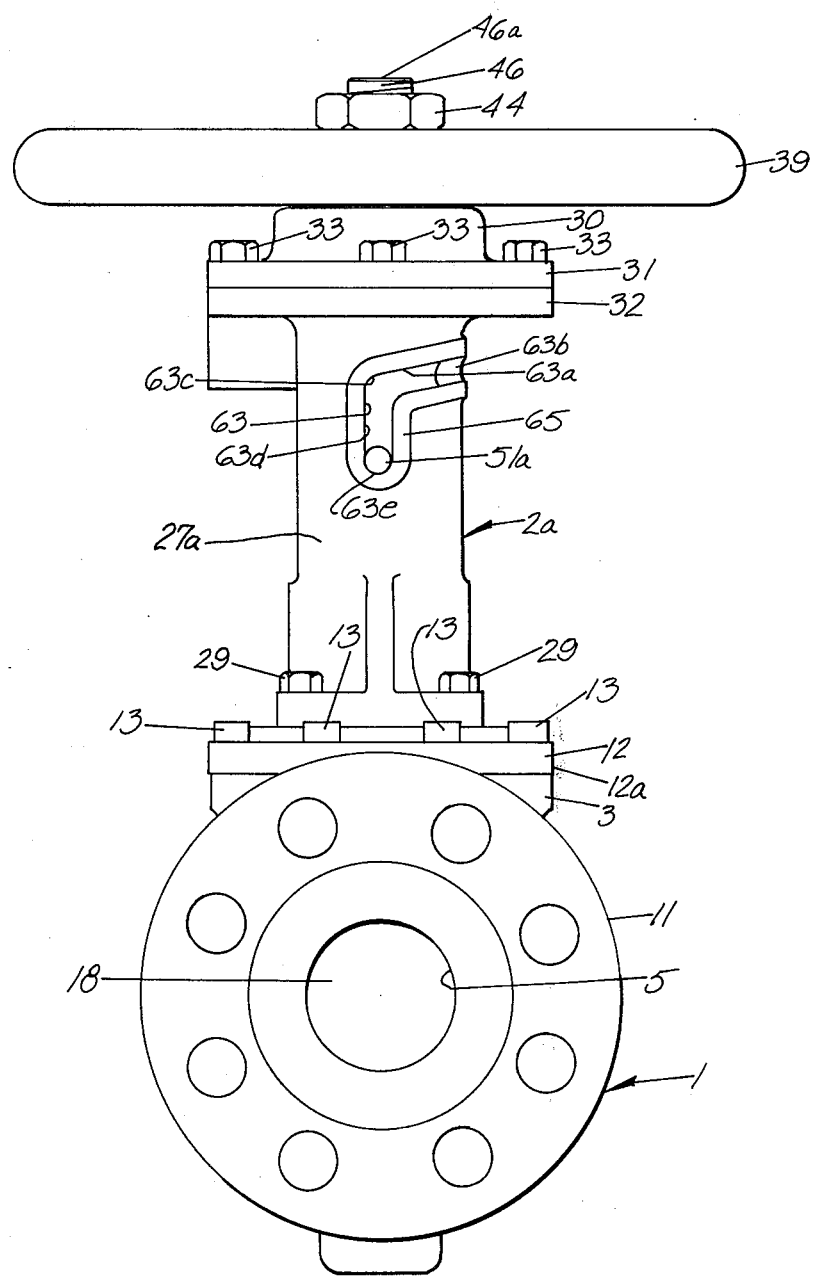

PLUG VALVE ACTUATOR

TECHNICAL FIELD

The invention relates to a plug valve actuator, and more particularly to such an actuator which shifts the plug between a closed and sealed position and an open position in which the plug is rotated 90° with respect to its closed position, the actuator being such that the plug is not rotated while its seals are in contact with the valve body chamber walls.

BACKGROUND ART

The present invention is directed to an improved actuator for plug-type valves. The particular use made of the valve does not constitute a limitation of the present invention.

Prior art workers have utilized a number of arrangements of cam slots and cam follower means for translating linear motion into rotative motion, or vice versa, in association with the actuation of valves. Exemplary arrangements are taught in U.S. Pat. Nos. 2,703,589; 2,883,144; 3,078,065; 3,319,925; 3,370,827 and 3,450,382.

U.S. Pat. No. 3,184,214 teaches a cam operated actuator for a plug valve. The plug valve is provided with a tubular coupling member having cam slots formed therein. The cam slots, however, simply convert linear motion to rotative motion to rotate the plug between its open and closed positions. The arrangement does not vertically shift the valve plug.

Prior art workers having also developed actuators for valves of the plug type wherein when the plug is to be shifted from its valve-closed position to its valve-open position, it is first lifted vertically and thereafter rotated. When the valve plug is to be shifted from its valve-open position to its valve-closed position, it is first rotated and thereafter lowered to its valve-closed position. U.S. Pat. No. 2,596,075 teaches a special thread and dog arrangement for accomplishing such movement of the valve plug. U.S. Pat. No. 3,492,880 sets forth cam slot and cam follower means for accomplishing this motion of the valve plug. In both of the last mentioned patents, the vertical linear motion and the rotative motion are wholly separate, occurring one after the other. The structures of both of these patents are extremely complicated, requiring numerous parts.

The actuator of the present invention represents an improvement over actuators of the type taught in the last mentioned United States Letters Patent. When the actuator shifts the plug from its valve-closed position to its valve-open position, it first lifts the plug vertically without rotation and thereafter simultaneously lifts and rotates the valve to its final valve-open position. During the valve closing procedure, the actuator first simultaneously rotates and lowers the plug and thereafter continues to lower the plug without rotation into its final valve-closed and sealed position. As a result, the resilient seals of the plug are never rotated when in contact with the valve body, thus preventing abrasion of the resilient seals. The valve actuator comprises a minimum of parts, all of which are readily serviceable and replaceable. As a result, the actuator is extremely simple in construction and inexpensive to manufacture.

The actuator is self-locking against torque imparted to the plug by the fluid medium passing through the valve. Rotation of the plug 90° between its valve-open and valve-closed positions is accomplished in a minimum of vertical travel of the plug and since this rotation is accomplished simultaneously with a portion of the vertical shifting of the plug during both the opening and closing operations, the actuator can be more compact than actuators heretofore developed.

DISCLOSURE OF THE INVENTION

In accordance with the invention there is provided an actuator for a plug valve of the type having a body with a central chamber and diametrically opposed inlet and outlets ports communicating with the central chamber. The valve has a plug within the chamber. The plug has a transverse passage therethrough and an upstanding stem.

The plug has a first, upper valve-open position within the chamber with the transverse plug passage being in alignment with the inlet and outlet ports. The plug has a second, lower, valve-closed position within the chamber wherein its transverse passage is oriented at 90° to the inlet and outlet ports and wherein seal means on the plug are in sealing engagement with the chamber wall about the inlet and outlet ports. The top of the chamber is closed by a bonnet having a packing gland through which the plug stem extends upwardly.

The actuator comprises a hollow, cylindrical yoke, the lower end of which is affixed to the bonnet with the plug stem extending partway into the yoke. A bearing cap is mounted at the upper end of the yoke. A drive nut having a threaded axial bore and a hand wheel or other manual manipulator affixed thereto is rotatively mounted in the bearing cap. A threaded stem is engaged in the drive nut. The lower end of the threaded stem and the upper end of the plug stem are both non-rotatively affixed to a cylindrical coupling within the yoke.

In one embodiment of the invention, the cylindrical coupling has a pair of diametrically opposed, identical, L-shaped cam slots. Each of the L-shaped cam slots has a first vertical portion and a second portion which extends 90° about the coupling and slopes downwardly throughout its length. The yoke has two cam pins threadedly engaged in diametrically opposed perforations in the yoke. The innermost ends of the cam pins are unthreaded and are engaged in the cam slots of the coupling.

In a second embodiment of the invention, a pair of identical, diametrically opposed cam slots are formed in the body of the yoke itself. These cam slots are similar to those just described but are of inverted L-shaped configuration. Thus, the cam slots formed in the yoke each have a first portion which extends 90° about the yoke and slopes downwardly from their beginning points to the juncture with their second portions which extend vertically downwardly. In this second embodiment, the coupling within the yoke carries a pair of cam followers, each engaged in one of the yoke cam slots.

In both embodiments of the invention, the configuration of the cam slots is such that upon turning the drive nut in one direction, the plug (in its valve-open position) will be simultaneously partially lowered and turned 90°. Thereafter, continued turning of the drive nut will lower the plug without rotation to its valve-closed and sealed position.

When the drive nut is turned in the opposite direction, the plug (in its valve-closed position) will first be lifted vertically without rotation out of sealing relationship with the chamber inlet and outlet ports. Continued rotation of the valve nut in this direction will cause the plug to be simultaneously lifted and rotated 90° to its full valve-open position.

BRIEF DESCRIPTION OF THE DRAWINGS

FIG. 1 is an elevational view, partly in cross section of a valve incorporating the valve actuator of the present invention, the valve plug being shown in its valve-open position.

FIG. 2 is a side elevational view of the coupling of FIG. 1.

FIG. 3 is a top plan view of the coupling of FIG. 2.

FIG. 4 is a side elevational view of the coupling of FIG. 2 as seen from the left in FIG. 2.

FIG. 6 is an elevational view, partly in cross section, similar to FIG. 1 and illustrating the valve of FIG. 1 provided with another embodiment of valve actuator and illustrating the valve plug in its open position.

FIG. 7 is an elevational view of the valve and valve actuator of FIG. 6 as seen from the left in FIG. 6 and illustrating the valve in its valve-closed condition.

DETAILED DESCRIPTION OF THE INVENTION

Figure 1:
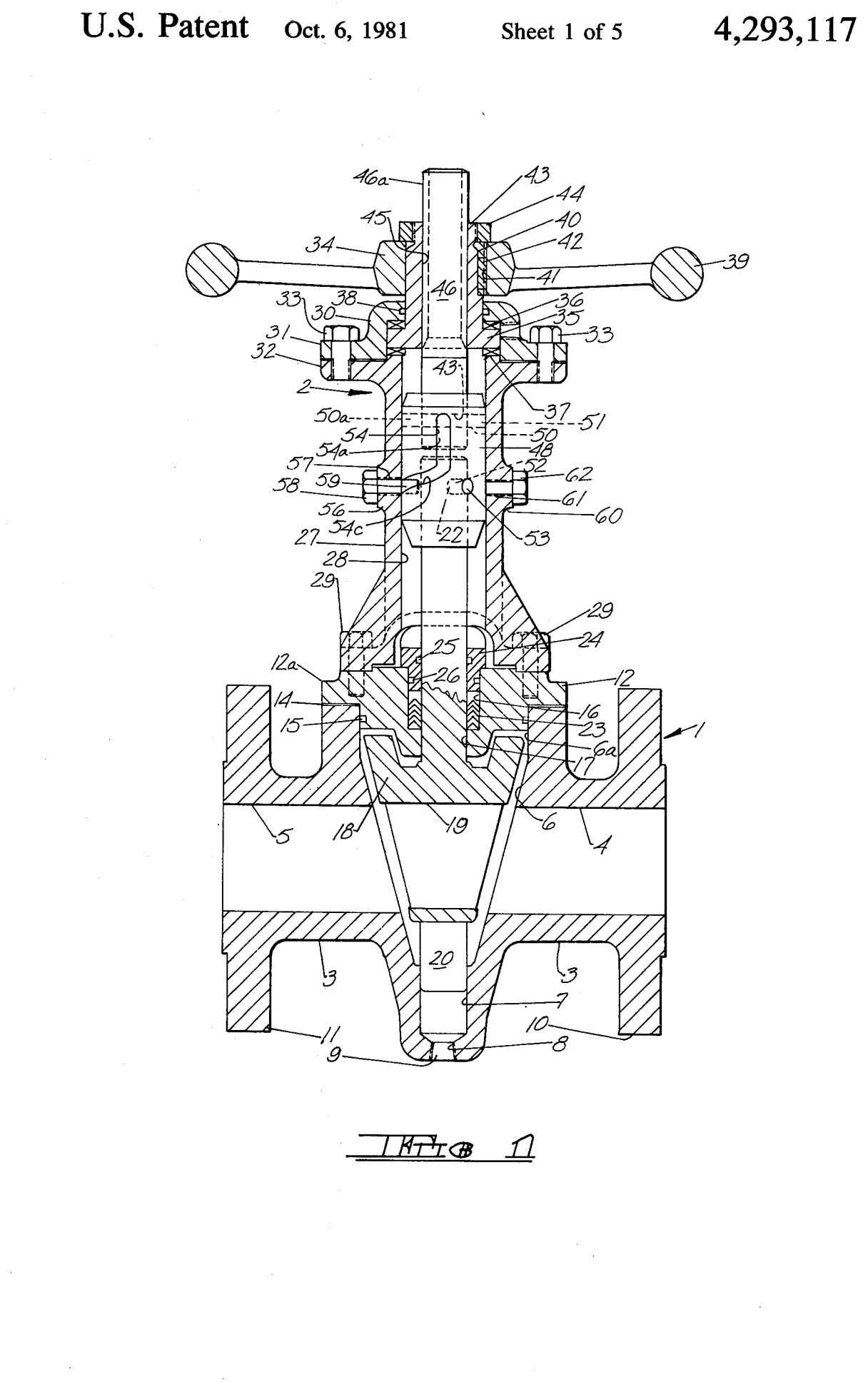
Figure 5:
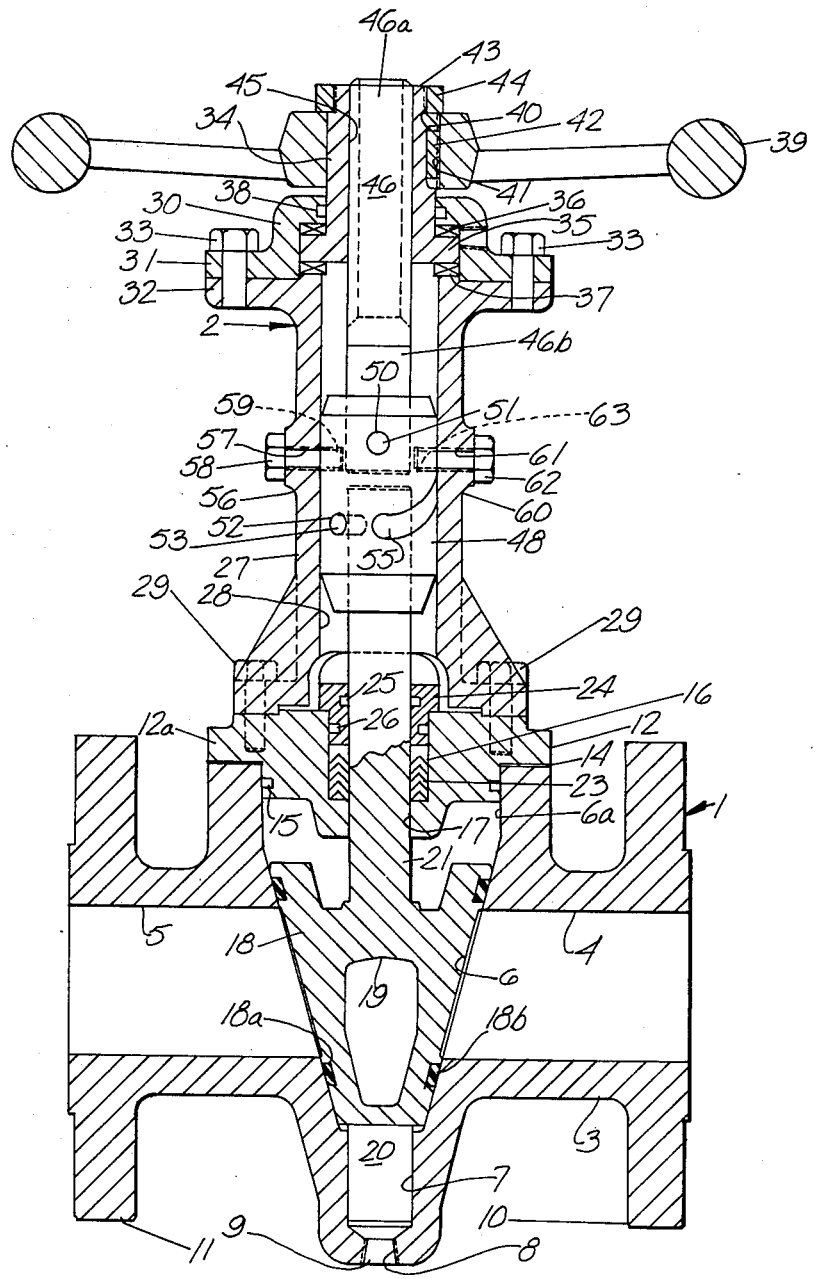
FIG. 5 is an elevational view, partly in cross section, similar to FIG. 1 and illustrating the valve plug in its valve-closed position.

Reference is first made to FIG. 1 which illustrates a valve provided with the valve actuator of the present invention.

The valve is generally indicated at 1 and the valve actuator is generally indicated at 2. The valve comprises a valve body 3 having an inlet port 4 and an outlet port 5. Between inlet port 4 and outlet port 5 there is a substantially conical valve chamber 6. The upper end of the valve chamber 6 is cylindrical as at 6a and is open. At the lower end of the chamber 6 there is a cylindrical bore 7 formed in the valve body and terminating in a port 8 closed by a pipe plug 9. To complete the valve body 3, the inlet port 4 and outlet port 5 may be provided at their ends with conventional coupling flanges 10 and 11, respectively, by which they may be appropriately connected to conduit means.

The upper cylindrical end 6a of valve chamber 6 is closed by a bonnet 12. The bonnet 12 has a flange portion 12a which rests upon the valve body 3 and is affixed thereto by a series of hex head screws 13. The hex head screws 13 are illustrated in FIG. 7. A gasket 14 is located between the valve body 3 and bonnet flange 12a.

The bonnet has a cylindrical body which is just nicely received in the cylindrical upper portion 6a of valve chamber 6. The bonnet is provided with an O-ring 15 making a sealing engagement with the cylindrical portion 6a of chamber 6. The bonnet 12 has a central bore 16 extending downwardly from the upper surface of the bonnet and terminating in a second coaxial bore 17 of lesser diameter.

The valve plug is shown at 18. The valve plug is conical in configuration and has a transverse passage 19 extending therethrough. The plug also carries a pair of diametrically opposed seals 18a and 18b (see FIG. 5), the purpose of which will be apparent hereinafter. At its lower end, the plug 18 is provided with an integral, cylindrical extension 20 of such diameter as to be just nicely received and rotatable within the cylindrical bore 7 of valve body 3. At its upper end, the plug 18 is provided with an upward extending, integral, cylindrical plug stem 21. The plug stem is rotatively received in bonnet bore 17 and extends upwardly through bonnet bore 16. At its upper end, plug stem 21 is provided with a transverse perforation 22, the purpose of which will be described hereinafter.

To form a fluid tight seal between the bonnet 12 and the plug stem 21, the lower portion of bonnet bore 16 is provided with packing 23. A convention packing gland 24 is mounted in the upper end of bonnet bore 16 and has a first O-ring 25 in sealing engagement with the plug stem 21 and a second O-ring 26 in sealing engagement with the inside surface of bonnet bore 16.

The valve actuator 2 comprises a cylindrical yoke 27 having an axial bore 28 extending therethrough. The lower end of yoke 27 is affixed to bonnet 12 by a series of hex and head screws, two of which are shown in FIG. 1 at 29. The upper end of yoke 27 is provided with a bearing cap 30. The bearing cap 30 has an annular flange 31 and the upper end of the yoke 27 has a corresponding flange 32. The flanges 31 and 32 are joined together by a plurality of hex head cap screws, two of which are shown at 33.

A cylindrical drive nut 34 has at its lower end an annular flange 35 which is captively mounted between the upper end of yoke 27 and bearing cap 30. Above and below the annular flange 35 thrust bearings 36 and 37 are provided. The thrust bearings may be of any appropriate type. For example, they each may comprise a roller assembly having an upper and a lower race. By virtue of thurst bearings 36 and 37, the drive nut 34 is rotatively mounted with respect to yoke 27 and bearing cap 30. The bearing cap may have an O-ring 38 sealing against drive nut 34 so as to retain lubricant provided for the thrust bearings 36 and 37.

The means for imparting rotation to drive nut 34 does not constitute a limitation on the present invention. The drive nut 34 may be rotated by some form of prime mover, or by a conventional manually manipulated device such as a lever or the like. For purposes of an exemplary showing, the drive nut 34 is illustrated as having a hand wheel 39 mounted thereon. To this end, the drive nut is provided with a vertical slot 40 and the hub of hand wheel 39 is provided with a corresponding slot 41 into which a key 42 may be inserted so that the hand wheel 39 is non-rotatable with respect to drive nut 34. The uppermost end 43 of drive nut 34 is of reduced diameter and is externally threaded so as to receive a retaining nut 44 for hand wheel 39.

Drive nut 34 has an axial threaded bore 45. A valve stem is indicated at 46 and has an upper threaded portion 46a and a lower unthreaded portion 46b. The upper threaded portion 46a of valve stem 46 is threadedly engaged in the bore 45 of drive nut 34. The lower end of the unthreaded portion 46b of valve stem 46 terminates just short of the upper end of plug stem 21 and is provided with a transverse bore 47, the purpose of which will be described hereinafter.

The lower end of valve stem 46 is non-rotatively connected to the upper end of plug stem 21 by a cylindrical coupling 48 located within the bore 28 of yoke 27. The cylindrical coupling 48 has an external diameter such that it is freely shiftable and rotatable within yoke bore 28. For a better understanding of coupling 48, reference is now made to FIGS. 2 through 4, wherein like parts are given like index numerals.

The cylindrical coupling 48 is provided with an axial bore 49 of such diameter as to just nicely receive the lower end of valve stem 46 and the upper end of plug stem 21. Near its upper end, coupling 48 is provided with a pair of diametrically opposed transverse perforations 50 and 50a which are intended to be coaxial with the transverse perforation 47 of valve stem 46 (see FIG. 1), and to have a coupling pin 51 located therein. In this way, the lower end of valve stem 46 is non-rotatively affixed to coupling 48.

Near its lower end, coupling 48 is provided with a pair of diametrically opposed transverse perforations 52 and 52a. Perforations 52 and 52a are adapted to be located so as to be coaxial with the transverse perforation 22 in the upper end of plug stem 21 and to receive a coupling pin 53 therein. In this way, the plug stem 21 is also non-rotatively affixed to coupling 48. It will be noted from FIG. 3 that the axes of perforations 50-50a and 52-52a lie at an included angle with respect to each other of about 50°.

Coupling 48 also has an identical, diametrically opposed pair of cam slots 54 and 55 formed therein. Cam slot 54 is clearly shown in FIGS. 2 and 4. Cam slot 54 has a first upper portion which is vertical and which has a rounded upper end 54b. Cam slot 54 also has a lower portion 54c which extends 90° about the coupling 48 and terminates in a rounded end 54d. The juncture of cam slot portions 54a and 54c is rounded as at 54e. The cam slot lower portion 54c slopes downwardly from the juncture 54e to its rounded end 54d. The angle of slope of the cam slot portion 54c is chosen so as to permit 90° rotation of the coupling with a minimum of vertical movement commensurate with the loads on the coupling and on the cam followers to be described hereinafter. As indicated above, the cam slot 55 is identical to cam slot 54. Those portions of cam slot 55 which would be visible through cam slot 54 in FIGS. 2 and 4 have been eliminated from these Figures for purposes of clarity.

Reference is again made to FIG. 1. The yoke 27 has a laterally extending boss 56 having a threaded perforation 57 formed therethrough. The threaded perforation 57 is adapted to receive a hex head screw 58. The forwardmost end 59 of screw 58 is unthreaded and is of slightly smaller diameter. This forwardmost end 59 of screw 58 is of such size as to be just nicely received in cam slot 54, serving as a cam follower therefor. In similar fashion, the yoke is provided with a diametrically opposed boss 60 having a threaded perforation 61 therein to receive a hex head screw 62. The forwardmost end 63 of hex head screw 62 (shown in FIG. 5) is identical to the forwardmost end 59 of hex head screw 58 and serves as a cam follower for cam slot 55.

The structure having been fully described, its operation can be readily understood with reference to FIGS. 1 and 5. FIG. 1 illustrates the plug 18 of valve 1 in its open position. In this position, the plug is raised away from the inside surface of chamber 6 and the transverse perforation 19 in the plug is aligned with inlet passage 4 and outlet passage 5. The cam follower 59 (the forwardmost end of screw 58) is in abutment with the rounded end 54d of the lower second portion 54c of cam slot 54 (see also FIG. 4). Similarly, cam follower 63 (the forwardmost end of screw 62) is in abutment with the identical rounded end of the lowermost second portion of cam slot 55. Valve stem 46 is in its uppermost vertical position relative to drive nut 34.

To cause plug 18 to shift to its valve-closed position, hand wheel 39 is turned in that direction which will result in downward movement of valve stem 46 with respect to drive nut 34. Since valve stem 46, coupling 48 and plug stem 21 are non-rotatively joined together by coupling pins 51 and 53, all three of these elements will shift downwardly. Cam followers 59 and 63, by virtue of their engagement in coupling cam slots 54 and 55, respectively, will shift along the lower second portions of these cam slot causing valve stem 46, coupling 48, plug stem 21 and plug 18 to rotate 90° during the initial downward movement of these elements. This rotation of these elements will terminate when cam follower 59 reaches the juncture 54e of the first upper portion 54a and the second lower portion 54c of cam slot 54 and when cam follower 63 reaches the same position with respect to cam slot 55. As a result of this rotation, the axis of the transverse perforation 19 of valve plug 18 now lies at an angle of 90° to the axes of inlet port 4 and outlet port 5. As further downward movement of valve stem 46, coupling 48 plug stem 21 and plug 18 continues, cam follower 59 is engaged in the first, upper, vertical portion 54a of cam slot 54 while cam follower 63 is engaged in the identical portion of cam slot 55. The interaction of these cam followers and cam slots preclude further rotation of the valve stem 46, coupling 48, stem 21 and plug 18 so that only a vertical downward motion is imparted to these elements. This motion continues until plug 18 is fully seated in valve chamber 6 with its resilient seals in sealing engagement with the wall of valve chamber 6 about the openings thereinto formed by inlet port 4 and outlet port 5. This position of valve plug 18 is illustrated in FIG. 5. It will be evident from FIG. 5 that cam followers 59 and 63 are now at the upper ends of the first portions of their respective cam slots 54 and 55 and valve stem 46 is in its lowermost vertical position with respect to drive nut 34.

To reopen the valve 1, hand wheel 39 is turned in the opposite direction (i.e., a direction which will cause valve stem 46 to lift vertically). Lifting of valve stem 46 will, of course, result in lifting of coupling 48, stem 21 and plug 18. During the lifting action, cam followers 59 and 63 are in the first, upper, vertical portions of their respective cam slots 54 and 55 and therefore preclude rotation of valve stem 46, coupling 58, stem 11 and plug 18. As a result, the plug shifts vertically upwardly without rotation and its seals 18a and 18b will become disengaged from the inside surface of chamber 6. Thus, seals 18a and 18b do not rotate while touching the valve body and during this initial movement of plug 18, the plug will maintain its rotative orientation illustrated in FIG. 5.

Vertical movement of plug 18 without rotation will continue until cam follower 59 reaches the juncture 54e of the first upper portion 54a and the second lower portion 54c of cam slot 54 and cam follower 63 reaches the equivalent position in cam slot 55. As the cam followers 59 and 63 enter the second, lower portions of their respective cam slots 54 and 55 the interaction of the cam followers and cam slots will result in rotation of valve stem 46, coupling 48, stem 21 and plug 18 90°, while these elements continue to shift vertically upwardly, until the plug reaches its full valve-open position illustrated in FIG. 1 with its transverse perforation 19 in alignment with inlet port 4 and outlet port 5.

A modification of the valve actuator of the present invention is illustrated in FIGS. 6 and 7. The valve 1, itself, is identical and the actuator 2a is similar to the actuator 2 illustrated in FIGS. 1 and 5. As a result, like parts have been given like index numerals. The differences between the valve actuator 2a of FIGS. 6 and 7 and the valve actuator 2 of FIGS. 1 and 5 lie solely in the body of the yoke 27a the coupling 48a and the connecting pins 51a and 53a. In all other respect, the valve actuator 2a is identical to that of FIGS. 1 and 5.

The coupling 48a is a cylindrical member similar in external configuration to the coupling 48 of FIGS. 2 through 4. The coupling 48a has an external diameter such that it is both shiftable vertically and rotatable within the axial bore 28 of yoke 27a. Coupling 48a has an axial bore 49a identical to central bore 49 of coupling 48. Near its upper end, coupling 48a has a pair of diametrically opposed perforations, one of which is shown at 50b. These perforations are equivalent to perforations 50 and 50a of coupling 48. Near its lower end, the coupling has a second pair of diametrically opposed perforations 52b and 52c equivalent to perforations 52 and 52a of coupling 48. Unlike coupling 48, however, the upper diametrically opposed pair of perforations (one of which is shown at 50b) and the lower pair of perforations 52b and 52c have their axes oriented at 90° to each other, as is clear from FIG. 6. The final difference between coupling 48a and coupling 48 lies in the fact that coupling 48a has no cam grooves formed therein. The upper end of plug stem 21 is located within coupling bore 49a and is non-rotatively attached to coupling 48a by pin 53a extending through the upper transverse perforation 22 in plug stem 21 and the diametrically opposed perforations 52b and 52c of coupling 48a. The lower, unthreaded portion 46b of valve stem 46 is also received within axial bore 49a of coupling 48a and is non-rotatively affixed to coupling 48a by a pin 51 passing through the diametrically opposed perforations in the coupling (one of which is shown at 50b) and the transverse perforation 47 in valve stem 46 (see FIG. 1). The pin 51a differs from pin 51 of FIG. 1 in that its ends extend beyond the exterior surface of coupling 48a, serving as cam followers, as will be evident hereafter.

Yoke 27a differs from yoke 27 of FIG. 1 only in that the bosses 56 and 60 have been eliminated together with screws 58 and 62. In their place, yoke 27a has two diametrically opposed, identical cam slots 63 and 64 formed therein.

Cam slot 63 is most clearly shown in FIG. 7. Cam slot 63 is substantially identical to cam slot 54 of FIGS. 2 through 4 with the exception that it is inverted. To this end, cam slot 63 has a first, upper portion 63a equivalent to cam slot portion 54c of FIGS. 2 and 4, terminating at its uppermost end in a rounded end 63b equivalent to rounded end 54d of FIGS. 2 and 4. The other end of cam slot portion 63a terminates in a juncture 63c equivalent to juncture 54e of FIGS. 2 and 4. Cam slot 63 has a second, lower portion 63d which is vertical and which is equivalent to cam slot portion 54a of FIGS. 2 and 4. The cam slot portion 63d terminates in a rounded lower end 63e equivalent to rounded end 54b of FIG. 2. The entire cam slot 63 is surrounded by a raised boss 65. It will be understood that cam slot 64 is identical to cam slot 63 and is surrounded by a raised boss 66 (see FIG. 6). As indicated above, the ends of pin 51a extend beyond the confines of coupling 48a and serve as cam followers. As a consequence, the cam follower end portions of pin 51a extend into cam slots 63 and 64.

The operation of the actuator 2a is similar to that of actuator 2 of FIGS. 1 and 5 and may be described as follows. Referring first to FIG. 6, the valve is illustrated in its valve-open position. Thus, plug 18 is in its upper position with its transverse perforation 19 in alignment with inlet port 4 and outlet port 5. Valve stem 46 is in its uppermost axial position with respect to drive nut 34 and coupling 48a is in its uppermost position with the cam follower ends of pin 51a in their uppermost position. It will be evident from FIG. 7 that when the cam follower ends of pin 51a are in their uppermost position, one of them will be in abutment with the uppermost end 63b of cam slot 63 while the other will be in abutment with the similar uppermost end of cam slot 64.

To shift plug 18 to its valve-closed position, hand wheel 39 is turned in such a direction as to cause valve stem 46 to move vertically downwardly with respect to drive nut 34. This will impart downward movement to coupling 48a, stem 21 and plug 18. During the initial downward movement of coupling 48a, the cam follower ends of pin 51a will advance through the first, upper portion of cam slot 63 and the corresponding portion of cam slot 64. These portions extend 90° about yoke 27a and slope downwardly. This will result in a first partial downward movement of the plug 18 and a simultaneous rotation of the plug 90° to a position wherein the axis of its transverse perforation 19 lies at an angle of 90° to the axes of inlet port 4 and outlet port 5. This 90° turn is completed when the cam ends of pin 51a reach the juncture 63c of cam slot 63 and the corresponding juncture of cam slot 64. Further downward movement of the assembly of the valve stem 46, coupling 48a, stem 21 and plug 19 will be without rotation by virtue of the engagement of the cam follower ends of pin 51a in the second, lower portion 63d of cam slots 63 and the corresponding portion of cam slot 64, these portions being vertical and precluding rotation of the assembly. Downward movement of the plug continues until the cam follower ends of pin 51a abut the lowermost end 63e of cam slot 63 and the similar lowermost end of cam slot 64 whereupon the seals 18a and 18b of the plug will engage the wall of chamber 6 about outlet port 5 and inlet port 4, respectively, the plug 18 having reached its fully seated, valve-closed position.

When the valve 1 is in its closed condition as shown in FIG. 7, it can be returned to its open condition as illustrated in FIG. 6 simply by turning hand wheel 39 in a direction which will cause vertical upward movement of valve stem 46 with respect to drive nut 34. Upward movement of valve stem 46 will be imparted directly to coupling 48, stem 21 and plug 18. Since the cam follower ends of pin 51a are in the second, lower, vertical portion 63d of cam slot 63 and the corresponding portion of cam slot 64, the upward movement of the plug will be without rotation until the cam ends of pin 51a reach the juncture 63c of cam slot 63 and the corresponding juncture of cam slot 64. This will assure that the seals 18a and 18b will be disengage from the inside surface of valve chamber 6 without rotation and consequent wear.

Continued upward shifting of valve stem 63, coupling 48a and plug 18 will simultaneously result in rotation of these elements 90° by virtue of the travel of the cam follower ends of pin 51a in the first, upper portion 63a of cam slot 63 and the corresponding portion of cam slot 64. When the cam follower ends of pin 51a abut the uppermost end 63b of cam slot 63 and the corresponding uppermost end of cam slot 64 (the position shown in FIG. 6) the plug 48 will achieve its full valve-open position, with its transverse perforation 19 once again in alignment with inlet port 4 and outlet port 5.

It will be understood that the ends of pin 53a (FIG. 6) could be used as cam followers rather than the ends of pin 51a, if the identical, diametrically opposed slots 63 and 64 were appropriately positioned lower on yoke 27a. In both the embodiment illustrated in FIGS. 1 through 5 and the embodiment illustrated in FIGS. 6 and 7, the interaction of the cam slots and cam followers will assure that the plug will stay in any rotative position to which it is brought by hand wheel 39 since it will resist any turning forces imparted to the plug by the fluid medium within the valve.

Modifications may be made in the invention without departing from the spirit of it.

What I claim is:

1. In a plug-type valve having a body with a plug chamber and diametrically opposed inlet and outlet ports communicating with said chamber, a plug in said chamber having a transverse passage therethrough and an upstanding stem, said plug being shiftable between a first, upper, valve-open position with its transverse passage in alignment with said inlet and outlet ports and a second, lower, valve-closed position wherein the axis of said transverse plug passage is oriented at 90° to the axes of said inlet and outlet ports, seal means on said plug, said seal means being in engagement with the interior surface of said chamber about said inlet and outlet ports when said plug is in said second, valve closed position, a bonnet closing the upper end of said chamber, a packing gland mounted in said bonnet through which said plug stem extends, the improvement comprising a yoke having a vertical axial bore therethrough, said yoke having a lower end affixed to said bonnet with the stem of said plug extending into said axial bore of said yoke, said yoke having an upper end, a bearing cap mounted on said upper end of said yoke, a drive nut having a vertical, threaded, axial bore, said drive nut being rotatively mounted in said bearing cap, a valve stem, the upper portion of said valve stem being threaded and being engaged in said threaded axial bore of said drive nut, said valve stem and said plug stem being coaxial, a single cylindrical coupling located within said axial bore of said yoke and being both rotatable and shiftable vertically therein, the lower end of said valve stem and the upper end of said plug stem both being non-rotatively affixed to said coupling, one of said yoke and said coupling having a single pair of diametrically opposed identical cam slots formed therein, a cam follower for each of said cam slots being supported by the other of said yoke and said coupling, said cam slots being so configured that when said cam slots are located in said yoke they are in an inverted position from that which they occupy when located in said coupling, such that upon turning said drive nut in one direction, said plug in said valve-open position will be simultaneously partially lowered and turned 90° and thereafter lowered without rotation to said valve-closed position with said plug seals in engagement with said chamber interior surface about said inlet and outlet ports, and upon turning said drive nut in the opposite direction, said plug will first be lifted vertically without rotation out of sealing relationship with said chamber inlet and outlet ports and thereafter will be simultaneously lifted and rotated 90° to said valve-open position, whereby to provide a structure which is simple in construction, compact and self-locking.

2. The structure claimed in claim 1 wherein said coupling has an axial bore extending therethrough, said lower end of said valve stem extending downwardly into said axial coupling bore and being affixed to said coupling by a first pin extending through coaxial transverse perforations in said coupling and said lower end of said valve stem, said upper end of said plug stem extending upwardly into said axial coupling bore and being affixed to said coupling by a second pin extending through coaxial transverse perforations in said coupling and said upper end of said plug stem.

3. The structure claimed in claim 1 wherein said cam slots are formed in said cylindrical coupling, each of said cam slots being substantially L-shaped and having a first vertical portion and a second portion sloping downwardly from said first portion and extending 90° about said coupling, said cam followers being mounted on said yoke and extending into said cam slots.

4. The structure claimed in claim 1 wherein said identical, diametrically opposed cam slots are formed in said yoke, each of said cam slots being of substantially inverted L-shape and having first and second portions, said first portion extending 90° about said yoke and sloping downwardly to said second portion, said second portion being vertical, said cam followers being mounted on said coupling.

5. The structure claimed in claim 1 including a hand wheel affixed to said drive nut.

6. The structure claimed in claim 2 wherein said cam followers comprise screws mounted in diametrically opposed, threaded, transverse bores in said yoke, each of said screws having an unthreaded forwardmost end located within one of said cam slots.

7. The structure claimed in claim 3 wherein said coupling has an axial bore extending therethrough, said lower end of said valve stem extending downwardly into said axial coupling bore and being affixed to said coupling by a first pin extending through coaxial transverse perforations in said coupling and said lower end of said valve stem, said upper end of said plug stem extending upwardly into said axial coupling bore and being affixed to said coupling by a second pin extending through coaxial transverse perforations in said coupling and said upper end of said plug stem.

8. The structure claimed in claim 4 wherein said coupling has an axial bore extending therethrough, said lower end of said valve stem extending downwardly into said axial coupling bore and being affixed to said coupling by a first pin extending through coaxial transverse perforations in said coupling and said lower end of said valve stem, said upper end of said plug stem extending upwardly into said axial coupling bore and being affixed to said coupling by a second pin extending through coaxial transverse perforations in said coupling and said upper end of said plug stem, one of said first and second pins having end portions extending beyond said coupling, said end portions comprising said cam followers and each of said end portions extending into one of said cam slots.

* * * * *